United States Patent [19]
Braun

[11] Patent Number: 4,722,248
[45] Date of Patent: Feb. 2, 1988

[54] TRANSMISSION SHIFT CONTROL SYSTEM

[75] Inventor: Eugene R. Braun, Royal Oak, Mich.

[73] Assignee: Eaton Corporation, Cleveland, Ohio

[21] Appl. No.: 850,641

[22] Filed: Apr. 11, 1986

[51] Int. Cl.$^4$ ............................................. B60K 41/04
[52] U.S. Cl. ........................................ 74/866; 74/745; 74/336 R
[58] Field of Search ................. 74/745, 866, 335, 365, 74/752 A, 339, 865, 336 R; 192/53 F, 3.58

[56] References Cited

U.S. PATENT DOCUMENTS

| | | | |
|---|---|---|---|
| 2,637,221 | 5/1953 | Backus et al. | 74/745 |
| 2,637,222 | 5/1953 | Backus | 74/335 |
| 3,105,395 | 10/1963 | Perkins | 74/745 |
| 3,283,613 | 11/1966 | Perkins | 74/745 |
| 3,478,851 | 11/1969 | Smyth et al. | 74/365 |
| 3,628,642 | 12/1971 | Ravenel | 74/866 X |
| 3,648,546 | 3/1972 | McNamara et al. | 74/745 |
| 3,741,035 | 6/1973 | May | 74/745 |
| 3,799,002 | 3/1974 | Richards | 74/745 |
| 4,208,929 | 6/1980 | Heino | 74/866 |
| 4,280,604 | 7/1981 | Lambicco | 74/866 X |
| 4,290,515 | 9/1981 | Bogema et al. | 192/53 F X |
| 4,294,341 | 10/1981 | Swart | 74/866 X |
| 4,312,248 | 1/1982 | Sugimoto et al. | 74/866 X |
| 4,324,153 | 4/1982 | Sugimoto et al. | 74/866 |
| 4,361,060 | 11/1982 | Smyth | 74/752 A X |
| 4,440,037 | 4/1984 | Foxton et al. | 74/745 X |
| 4,527,447 | 7/1985 | Richards | 74/745 |
| 4,561,055 | 12/1985 | McKee | 74/866 X |

Primary Examiner—Leslie Braun
Assistant Examiner—David Novais
Attorney, Agent, or Firm—D. A. Rowe; H. D. Gordon

[57] ABSTRACT

A vehicular transmission shift control system is provided for effecting automatic shifting between a group of sequentially related forward gear ratios provided by the transmission that includes a logic member (16) operative to receive and process an engine speed signal (22) and a gear ratio position signal (30) and to provide an output control signal (33) to a shift actuator (34) that is operative to enable automatic shifting between the sequentially related forward gear ratios whenever the lowest sequentially related forward gear ratios of the group is manually engaged by an operator of the vehicle.

14 Claims, 3 Drawing Figures

TRANSMISSION SHIFT CONTROL SYSTEM

INTRODUCTION

This invention relates generally to a shift control system for vehicular transmissions and more particularly to a semi-automatic shift control system that enables automatic shifting between higher sequentially related forward gear ratios of a vehicular transmission and particularly for a compound type transmission commonly employed in heavy duty truck applications.

BACKGROUND OF THE INVENTION

Compound type transmissions have been used advantageously for many years in heavy duty truck applications where a large number of transmission change gear ratios are employed in a manner to provide an efficient and smooth shifting performance over the speed range of the truck considering inertia and load factors involved.

Compound transmissions generally feature a combination of a main transmission section coupled in series with an auxiliary transmission section such that the number of forward change gear ratios obtainable from the combination is the product of the number of gear ratios respectively contained within the main and auxiliary transmission sections as is well known to those skilled in the art. Thus, for example, the number of gear ratios is sixteen for a compound transmission in which four gear ratios are contained within each of the main and auxiliary transmission sections coupled together in series.

The availability of particular gear ratios from the combination of the main and auxiliary sections of a compound type transmission have been the subject of considerable investigation in the past.

Broadly, compound transmissions are operative to provide a plurality of groups containing a plurality of forward gear ratios ranging from a first group that includes the lowest gear ratio to a last or highest group that includes the highest gear ratio available from the compound transmission.

More particularly, either range type or splitter type auxiliary sections or combinations of the the two have been employed to provide particular gear shifting sequence patterns. In compound transmissions having a range type auxiliary section, the auxiliary gear ratio steps are greater than the total ratio coverage of the main transmission section and the main transmission section is shifted progressively through its ratios in each range. Examples of compound transmissions having a range type auxiliary section can be found in U.S. Pat. Nos. 2,637,221; 2,637,222; and 3,105,395, the disclosures of all of which are included herein by reference.

In compound transmissions having a splitter type auxiliary section, the ratio steps of the splitter auxiliary section are less than the ratio step of the main transmission section and each main section ratio is split, or subdivided, by the splitter section. Examples of compound change gear transmissions having splitter type auxiliary sections may be seen by reference to U.S. Pat. Nos. 3,799,002; 4,290,515; 4,440,037; and 4,527,447, the disclosures of all of which are to be included herein by reference.

In a combined range and splitter type auxiliary section, both range and splitter type ratios are provided allowing the main section to be progressively shifted through its ratio in at least two ranges and also allowing the main section ratios to be split in at least one range. Examples of combined range and splitter auxiliary transmissions sections may be seen by reference to U.S. Pat. Nos. 3,283,613 and 3,648,546, the disclosures of which are respectively included herein by reference.

Until the recent past, compound transmissions, particularly for trucks, have historically been of the manual type requiring actuation of a clutch by an operator to shift between change gear ratios. Due to the large number of change gear ratios normally associated with compound transmissions, a great deal of effort was required to manually shift throughout the entire change gear ratios involved. More recently, efforts have been employed to combine manual shifting and automatic shifting under certain conditions such as disclosed in U.S. Pat. Nos. 4,208,929; 4,294,341; 4,312,248; and 4,324,153, the disclosures of all of which are included herein by reference.

Although a great deal of effort has been expended in the recent past to reduce operator fatigue and improve fuel economy, no one prior to the present invention had thought to provide standard or compound type transmissions with a shift control system that enabled manual shifting of lower gear ratios whilst enabling automatic shifting between particularly sequentially related higher gear ratios to relieve the operator of shifting burden under higher speed highway driving conditions and allow an automatic shift schedule for fuel economy.

SUMMARY OF THE INVENTION

Accordingly, it is an object of this invention to provide a shift control system for a vehicular transmission particularly of the compound type that provides both the simplicity and performance associated with manual gear shifting in lower gear ratios and the convenience and fuel economy of automatic shifting between sequentially related higher gear ratios of the transmission which is particularly advantageous in a multi-speed compound 9, 12, 13, 16 or 18 forward speed transmission utilized in an over the road truck to enable the truck to cruise at higher speeds without requiring manual shifting while maintaining fuel efficient gear ratios.

It is another object of this invention to provide a shift control system for a vehicular transmission particularly of the compound type that initiates and enables automatic shifting between prescribed sequentially related higher change gear ratios whilst enabling manual shifting amongst the remaining change gear ratios available from the transmission.

It is yet another object of this invention to provide a shift control system that provides low cost manual starting and lower gear ratio shifts in combination with the convenience and fuel economy of automatic shifting at higher gear ratios.

DESCRIPTION OF SOME PREFERRED EMBODIMENTS

Figure 1:
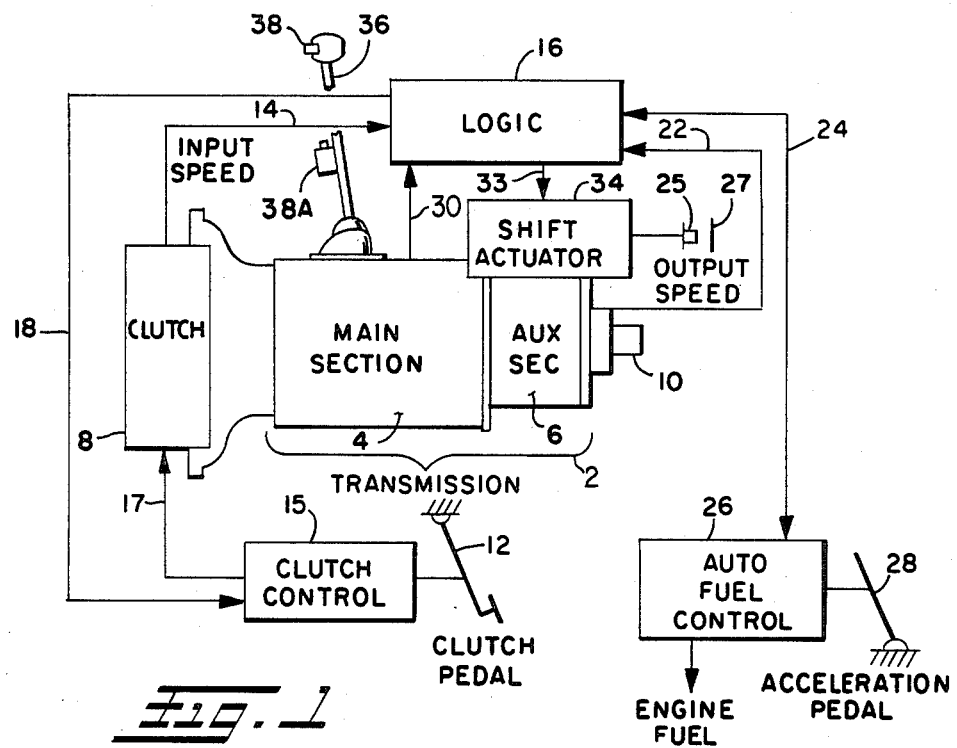
FIG. 1 shows a block diagram of an embodiment of the semi-automatic compound transmission shift control system of the invention.

FIG. 1 shows a compound type transmission 2 comprising a main section 4 coupled to an auxiliary section 6 controlled by the shift control system of the invention. Main section 4 is operatively coupled to the drive shaft of the vehicle engine (not shown) by clutch 8 and output shaft 10 of auxiliary section 6 is operatively coupled, commonly by means of a drive shaft, to the drive wheels of the vehicle (not shown).

The change gear ratios available from transmission 2 are manually selectable by first depressing clutch pedal 12 to disengage the engine drive shaft and then positioning shift arm 36 according to the shift pattern prescribed to engage the particular change gear ratio of main section 4 desired and thence, in the event the particular gear ratio desired is contained within auxiliary section 6, by operation of one or more actuators such as electrical shift button 38 or fluid actuating valve 38A to provide a signal operative to effect the engagement within auxiliary section 6 desired as is well known to those skilled in the operation of compound type transmissions.

Figures 2, 3:
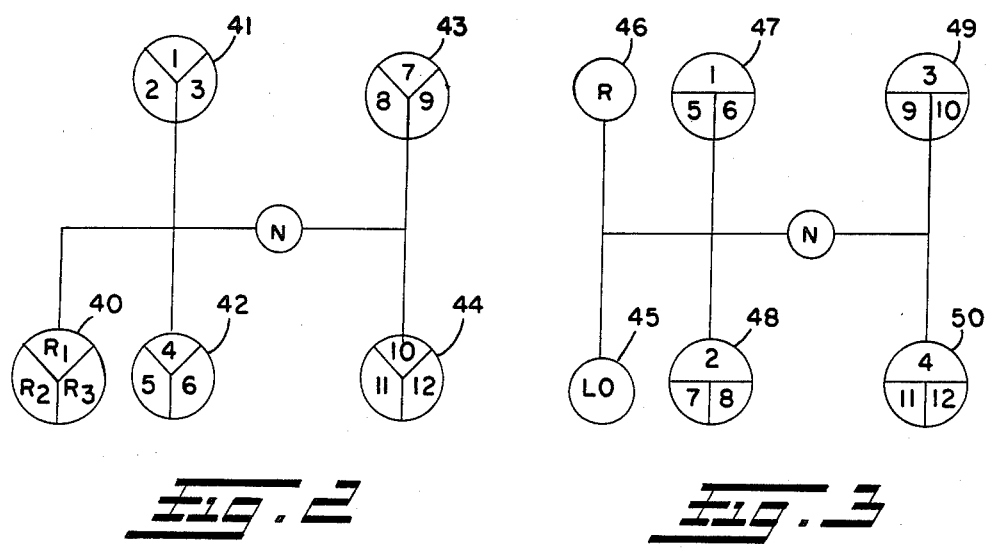
FIG. 2 shows a block diagram of a shifting pattern for a compound transmission having a splitter type auxiliary section for which the shift control system may be employed.
FIG. 3 shows another shifting pattern for a compound transmission having a combination of a range and splitter type auxiliary section for which the shift control system of the invention may be employed.

For the purpose of this invention, the term "group" as used herein shall mean the particular plurality of gear ratios available from a vehicular transmission and particularly from a compound type transmission when a particular gear ratio is manually selected by an operator and the term "sequentially related" as used herein shall mean between gear ratios available within the group selected provided there is no intervening gear ratio available within another group such as, for example, shown in group 50 of FIG. 3 where automatic shifting is effected between gear ratios 11 and 12 but not between gear ratio 4 and 11 or 12 since other groups contain gear ratios intermediate to gear ratios 4 and gear ratios 11 and 12. Generally, the transmission is of the type having a plurality of forward gear ratios of which one group selectable by the operator is sequentially related and less than the total number of gear ratios provided by the transmission and automatic shifting is effected between at least two of the sequentially related gear ratios.

Preferably, all of the gear ratios except the highest and those sequentially related to the highest in the group including the highest gear ratio, as hereinafter described with respect to FIGS. 2 and 3, are manually selectable by the operator by depressing clutch pedal 12 to cause clutch 8 to disengage transmission 2 from the engine drive member and then position shift arm 36 and actuate button 38 if required, and thence, upon engagement of the desired change gear ratio, release pedal 12.

The shift control system of the invention is operative to initiate and enable automatic shifting between at least the sequentially related gear ratios within the highest group and preferably between all sequentially related gear ratios within each group whenever the lowest gear ratio included within the group is selected by the operator.

The control system of the invention includes means for sensing and providing a suitable signal 30 to means operative to enable automatic shifting at the particular gear position desired. The means operative to enable automatic shifting includes logic circuitry 16, clutch control 15, auto fuel control 26 and shift actuator 34. Logic circuitry 16 is operative to receive and operate upon information including input speed signal 14, gear ratio position signal 30, output speed 22, and accelerator pedal position 28 to initiate and provide automatic shifting as required by the invention. Generally, automatic shifting is accomplished by shift actuator 34 including valves and the like well known to those skilled in the art according to the nature of a signal 33 received from logic circuitry 16 which, in turn, provides signal 18 to clutch control 15 which in turn provides signal 17 for automatic operation of clutch 8 in coordination with providing and receiving a signal 24 to automatic fuel control 26 relative manual operation of accelerator pedal 28 in addition to information concerning output speed of output shaft 10 provided logic circuitry 16 by signal 22.

The above described means by which automatic shifting is effected is well known to those skilled in the art excepting that it becomes operable only when the lowest gear ratio included in at least the group including the highest gear ratio is manually engaged by the operator. Examples of such automatic shifting may be appreciated in greater detail by reference to U.S. Pat. Nos. 4,361,060; 4,527,447; and 3,478,851, the disclosures of all of which are included herein by reference.

Examples of the operation of the shift control system of the invention in conjunction with specific shift sequence patterns for a compound transmission is hereinafter described with respect to FIGS. 2 and 3.

FIG. 2 shows shifting pattern sequence for a compound transmission having a splitter-type auxiliary section in which all of the gear ratios within each group are sequentially related.

The forward gear ratios are divided into groups 41–44 in addition to neutral position "N" and reverse gear ratio group 40 which includes three reverse gear ratios $R_1$; $R_2$; and $R_3$. The groups represent the combination of gear ratios available both from main section 4 of the compound transmission according to the position of shift arm 36 as well as the gear ratios available from the auxiliary section by actuation of button 38 and the like once the gear ratio in section 4 has been engaged as is well known to these skilled in the art. In FIG. 2, the lowest gear ratio is "1" contained in group 41 from which sequentially related gear ratios "2" and "3" may then be engaged by the operator actuating an actuator such as button 38 or fluid actuating valve 38A as the case may be. When the operator shifts arm 36 to gear ratio 4 of group 42, then sequentially related gear ratios 5 and 6 become available by an act of the operator such as actuation of button 38 or valve 38A and so on through the forward gear sequence pattern.

The highest gear ratio 12 is included in group 44 which also includes sequentially related lower gear ratios 10 and 11. Thus, when the operator manually engages gear ratio 10 by positioning shift arm 36, such is provided by signal 30 which causes implementation of automatic shift control amongst gear ratios 10, 11 and 12 since they are all sequentially related.

FIG. 3 shows a combination of range/splitter type compound transmission shifting sequence pattern. The pattern includes a single reverse gear position "R" for shift arm 36 as well as low ("lo") gear ratio position 45. The pattern further includes forward gear ratio groups 47–50 in addition to neutral position "N". In FIG. 3, the gear ratios within groups 47–50 are not all sequentially related.

In FIG. 3, when the operator selects low range, gear ratios "R", "LO", 1, 2, 3 and 4 become available by manually shifting lever 36. When the operator selects high range by operation, for example, of valve 38A, sequentially related ratios 5 and 6 become available when the operator manually engages the number 1 gear position of group 47 and so on. Once the operator manually engages the number 4 gear position in group 50, then automatic shifting is effected between sequentially related gear ratios 10 and 11 according to the invention. Similarly, automatic shifting is effected between gear ratios 9 and 10 once the operator manually selects gear position 3 of group 49 and between gear ratios 7 and 8 once the operator manually selects gear position 2 of group 48.

In addition to the advantages associated with automatic shifting between sequentially related higher gear ratios, the shift control system of the invention may further include means for limiting engine speed in the higher gear ratios such as, for example, for gear ratios 11 and 12 of group 50 of FIG. 3 and even lower sequentially related gear ratios for which automatic shifting is effected for purposes of fuel economy and the like. Such may be effected for example by the shift control system disclosed in my copending application by triggering a throttle stop or engaging a governor to limit fuel supply provided by fuel control 26 of FIG. 1 for particularly sequentially related gear ratios for which automatic shifting is effected by the control system of the invention.

Additionally, means for controlling engine and vehicular ground speed about a desired value (commonly called "cruise control") may be included independently or in conjunction with the shift control system of the invention for operating within the speed ranges provided by the sequentially related higher gear ratios for which automatic shifting is effected by the shift control system of the invention and which may be incorporated as part of fuel control 26 of FIG. 1.

Understandably, there may be situations where it is desired to manually shift amongst all of the gear ratios and, for such reason, the shift control system of the invention preferably includes means for rendering the control system inoperative when desired by an event such as actuation of a switch 25 by the operator shown in FIG. 1 or by some other event such as a signal operable to control system of the invention and enable manual rather than automatic shifting amongst all of the higher gear ratios of the transmission in addition to preferably including means indicating that conversion to manual shifting has been actuated for purposes of record and the like such as, for example, by having to break or displace a seal 27 or other type of barrier as shown in FIG. 1 to effect the disengagement of the shift control system of the invention.

What is claimed is:

1. A shift control system for a vehicular transmission having a plurality of groups of forward gear ratios ranging from a first group including a lowest gear ratio to a highest group including a highest gear ratio with each of said groups having a lowest gear ratio manually selectable by an operator and with at least said highest group including sequentially related higher gear ratios, said transmission including actuator means enabling automatic shifting between the sequentially related gear ratios of at least said highest group, and said control system including means for sensing at least when the lowest sequentially related gear ratio of said highest group is manually selected by the operator and operable to enable the actuator means to effect automatic shifting between the sequentially related gear ratios within said highest group when the lowest sequentially related gear ratio within said highest group is manually selected by the operator, all of the gear ratios of said first group requiring manual selection by the operator.

2. The control system of claim 1 wherein the transmission is a compound transmission comprising a main transmission coupled with an auxiliary transmission.

3. The control system of claim 1 including means for rendering said automatic shifting means inoperative and enabling manual shifting amongst all of the transmission gear ratios upon the occurrence of an event.

4. The control system of claim 3 wherein the event is a signal provided said control system by the operator.

5. The control system of claim 4 wherein means are included for assuring the operator that the automatic shifting means has been rendered inoperable.

6. The control system of claims 3 or 4 including means for providing a record of the event.

7. The control system of claim 1 including means for limiting engine speed at least for the speed range provided by the highest sequentially related gear ratio within said highest group.

8. The control system of claim 1 including cruise control means operative to control vehicular speed about a selected value at least within the speed range provided by said sequentially related gear ratios within said highest group.

9. A vehicular transmission controlled by the control system of claim 1.

10. A shift control system for a vehicular transmission having a plurality of groups of forward gear ratios ranging from a first group including a lowest gear ratio to a highest group including a highest gear ratio with each of said groups having a gear ratio manually selectable by an operator and with at least said highest group including a plurality of sequentially related highest gear ratios, said transmission including actuator means enabling automatic shifting between the highest sequentially related gear ratios of at least said highest group, and said control system including means for sensing when one of the sequentially related highest gear ratios of said highest group is manually selected by the operator and operable to enable the actuator means to effect automatic shifting between the sequentially related highest gear ratios within said highest group when one of the sequentially related highest gear ratios within said group is manually selected by the operator, the gear ratios of said first group requiring manual selection by the operator.

11. The control system of claim 10 wherein said vehicular transmission is a compound transmission having a main section connected in series with an auxiliary section including splitter gearing, said manual selection of one of the sequentially related highest gear ratios of said highest group comprising a main section gear ratio change and said automatic shifting between the highest sequentially related gear ratios within said highest group comprising only auxiliary section shifting.

12. A vehicular transmission controlled by the control system of claim 11.

13. The control system of claim 11 wherein the gear ratios of all but the highest group require manual selection and engagement by the operator.

14. The control system of claim 11 wherein the gear ratios of the first group require manual engagement by the operator.

* * * * *